United States Patent
Femböck

[11] Patent Number: 6,041,649
[45] Date of Patent: Mar. 28, 2000

[54] TIRE TESTING DEVICE HAVING AN INTELLIGENT TEST HEAD

[75] Inventor: Josef Femböck, Neuötting, Germany

[73] Assignee: Beissbarth GmbH, Germany

[21] Appl. No.: 09/121,067

[22] Filed: Jul. 21, 1998

[30] Foreign Application Priority Data

Jul. 22, 1997 [DE] Germany ............................ 197 31 486

[51] Int. Cl.[7] .................................................. G01M 17/02
[52] U.S. Cl. ........................................................ 73/146
[58] Field of Search .................................................. 73/146

[56] References Cited

U.S. PATENT DOCUMENTS

| 5,313,827 | 5/1994 | Yovichin | 73/146 |
| 5,777,219 | 7/1998 | Popio et al. | 73/146 |
| 5,786,533 | 7/1998 | Newman | 73/146 |

FOREIGN PATENT DOCUMENTS

| 42 31 578 A1 | 3/1994 | Germany. |
| 195 02 073 A1 | 7/1996 | Germany. |

OTHER PUBLICATIONS

Copy of U.S. application No. 09/093,890, filed Jun. 9, 1998.
Copy of U.S. application No. 09/094,143, filed Jun. 9, 1998.

*Primary Examiner*—Joseph L. Felber
*Attorney, Agent, or Firm*—Crompton, Seager & Tufte, LLC

[57] ABSTRACT

A tire testing device comprising an air pressure control means for changing the tire pressure of a wheel, a test head and a computer, which prior to and after a change in the air pressure produce an interferogram of the tire surface and convert the interferogram into a modulo-$2\pi$ image, which for its part is processed to yield a gray value image, and in which from a comparison of the gray value images information about defects present in the tire is obtained, a positioning means for the test head, with which the test head is to be positioned for producing interferograms at a predetermined distance from the tire, and a control means in order to incrementally rotate the wheel by an amount equal to a test segment, when the examination of the preceding test segment is completed, wherein an optical means for producing the interferograms, an electronic control means for the optical means and the air pressure control means are collected together in the test head and in that a sequence control means for the tire checking apparatus and means for evaluating the interferogram are provided in the computer.

17 Claims, 5 Drawing Sheets

TIRE TESTING DEVICE HAVING AN INTELLIGENT TEST HEAD

The invention relates to a tire testing device comprising an air pressure means for changing the tire pressure of a wheel, a test head, a computer, which prior to and after a change in the air pressure respectively with coherent radiation produce an interferogram of the tire surface and convert the interferogram into a modulo-$2\pi$ image, which for its part is processed to yield a gray value image, and in which from a comparison of the gray value images information about any defects present in the tire is obtained and a control means in order to incrementally rotate the wheel by an amount equal to a test segment, when the examination of the preceding test segment is completed.

BACKGROUND OF THE INVENTION

The German patent publication 4,231,578A1 discloses a method for determining the structural strength of tires, in the case of which coherent light is shone onto the tire, the radiation reflected by the tire is split up into two beams parts in a dual beam interferometer, in the dual beam interferometer one of the two beam parts is tilted in relation to the other beam part (shearing), in the dual beam interferometer one of the two parts of the radiation is incrementally shifted in phase, a component representing the radiation due to reflectance from the test object, which is split into two beam parts, is recombined in the dual beam interferometer by components forming an image of the surface of the tire with a large aperture, to an electronic image sensor system and the signals at the output of the image sensor system are digitalized and further processed in an image processing system to give a modulo-$2\pi$ image, and the modulo-$2\pi$ image is confirmed as an output gray value image.

In accordance with the German patent publication 19,502,073 A1 the above mentioned method is further developed by so partially differentiating the output gray value image that a second gray value image is produced, identical to the output gray value image and same is geometrically displaced in relation to the output gray value image in the shearing direction and is modified by a gray value, which is constant over the entire image range and the second gray value image, manipulated in this manner, is subtracted from the output gray value image so that a resulting gray value image is produced, on which any defects in the tire, which may be present, can be recognized.

When it is considered that structural damage in car tires, more particularly in the carcass including the belt, may substantially reduce the safety of driving the motor vehicle, it will be seen to be desirable to perform a tire check at regular intervals.

In U.S. patent application Ser. No. 09/094,143, which is incorporated herein by reference, there is a proposal for checking a tire by mounting the wheel, which bears the tire to be checked, on a wheel balancing machine and moving a test head up to the tire to be at a predetermined check distance for producing an interferogram. Checking for defects is performed on a first segment of the tire. Then the wheel is rotated further by the balancing machine by an amount equal to a checked segment and the last-mentioned steps are repeated until the entire tire has been checked. The tire testing device accordingly comprises a balancing machine, on which the wheel bearing the tire to be checked is mounted, a positioning means for a test head, with which the test head may be moved up to the tire as far as a predetermined check or test distance for producing an interferogram, and a control means for the balancing machine in order to rotate the wheel by an amount equal to one check segment.

In U.S. patent application Ser. No. 09/093,890, which is incorporated herein by reference, there is a proposal for checking a tire by mounting the wheel, which bears the tire to be checked, on a driven roller set. The tire checking comprises an air pressure means for changing the tire pressure and furthermore a testing head and a computer. Furthermore the apparatus comprises at least one driven roller set, onto which the motor vehicle with the wheel, which bears the tire to be checked, is to be driven, a positioning means for the test head, with which the test head can be moved toward the tire to be at a predetermined distance therefrom for producing interferograms and a control means for the roller set in order to rotate same an amount equal to the size of a check segment, when checking of the preceding segment has been completed.

SUMMARY OF THE INVENTION

One object of the invention is to create a tire checking apparatus, which allows the checking of a tires as part of servicing operations on the wheels of a motor vehicle or as part of a general technical examination of a motor vehicle, which must be performed from time to time, and in this respect the computing and evaluating operations are to be able to be performed as rapidly as possible and with minimum structural the hardware complexity.

For this purpose the tire checking apparatus of the invention is characterized in that an optical means for producing the interferograms, an electronic control means for the optical means and the air pressure control means are collected together in the test head and in that a sequence control means for the tire checking apparatus and means for evaluating the interferogram are provided in the computer. Owing to this division up of the optical and electronic units in the test head and in the principal computer (PC) rapid evaluation is achieved with a comparatively small amount of structural and hardware complexity.

In accordance with an advantageous development of the tire checking apparatus of the invention the test head comprises a CPU, the electronic control means for the optical means and the air pressure control means and same is connected via an interface with the computer. Accordingly all functions in the test head may be coordinated using but one single serial interface, as for example an RS-232 interface, with the computer means (PC).

In accordance with a further advantageous development the tire checking apparatus of the invention, wherein the optical means comprises a video camera, laser diodes and a piezo means, is characterized in that the electronic control means controlled by the computer for the optical means comprises a laser diode control means and a piezo means driver or control means.

An other preferred feature of the invention is characterized in that the air pressure control means comprises an air pressure sensor and a solenoid valve driver, the solenoid valve being preferably controllable both as regards the size of its aperture and as regards the time of opening. In this respect it is furthermore an advantage for the air pressure control means to reduce the tire pressure for each checking stage by one step and after the conclusion of checking to return it to the rated pressure.

In an advantageous fashion the structural complexity is even further reduced for checking tires in accordance with the invention because a power supply for the electronic units of the test head is integrated in the test head.

A further advantageous development of the invention is characterized in that a system bus, preferably an I²C bus, is provided for connection of the electronic units of the test head.

As regards the speed of operation of the test head it is an advantage for the electrical units of the test head to be collected together on a board, which preferably also comprises the power supply.

A further advantageous development of the invention is characterized in that a system bus, preferably an I²C bus, is provided for connection of the CPU with the piezo means control means of the test head.

A further advantageous design of the tire checking apparatus of the invention, wherein the wheel drive control means of a balancing machine serve for segment-wise incremental rotation of the wheel, is characterized in that the computer of the tire checking apparatus is integrated in the computer of the balancing machine. In other words the computer performs its function both during balancing of the wheels and also during tire checking.

In the case of the above mentioned embodiment it is an advantage for a synchro to be connected with the shaft of the balancing machine to sense further rotation of the shaft and causes the computer to respond thereto, which then turns off the motor drive, when the wheel has been rotated further by one check segment. Such synchros are in any case present in conventional balancing machines so that structural complexity is not increased.

A further advantageous design of the tire checking apparatus of the invention, wherein at least one driven roller set of the brake test dynamometer, on which the motor vehicle is to be driven having the wheel, which bears the tire to be checked, serves for segment-wise incremental rotation of the wheel, is characterized in that the computer of the tire checking apparatus is integrated in the computer of the brake test dynamometer.

In the above mentioned embodiment of the invention it is an advantage for a sensor roller to be provided, which senses the incremental rotation of the tire and via a synchro causes the computer to respond to such rotation, said computer then turning off the motor drive, when the tire has been further or incrementally turned through one check segment. Accordingly the roller set of the brake test dynamometer is adapted to the requirements of tire checking with a minimum of complexity.

Finally an advantageous development of the tire checking apparatus of the invention is characterized in that the motor for the segment-wise incremental rotation of the wheel is driven via a frequency converter, which may be controlled by the computer.

A further understanding of the nature and advantages of the present invention may be realized by reference to the remaining portions of the specification and the drawings.

DESCRIPTION OF THE SPECIFIC EMBODIMENTS

Figure 1:
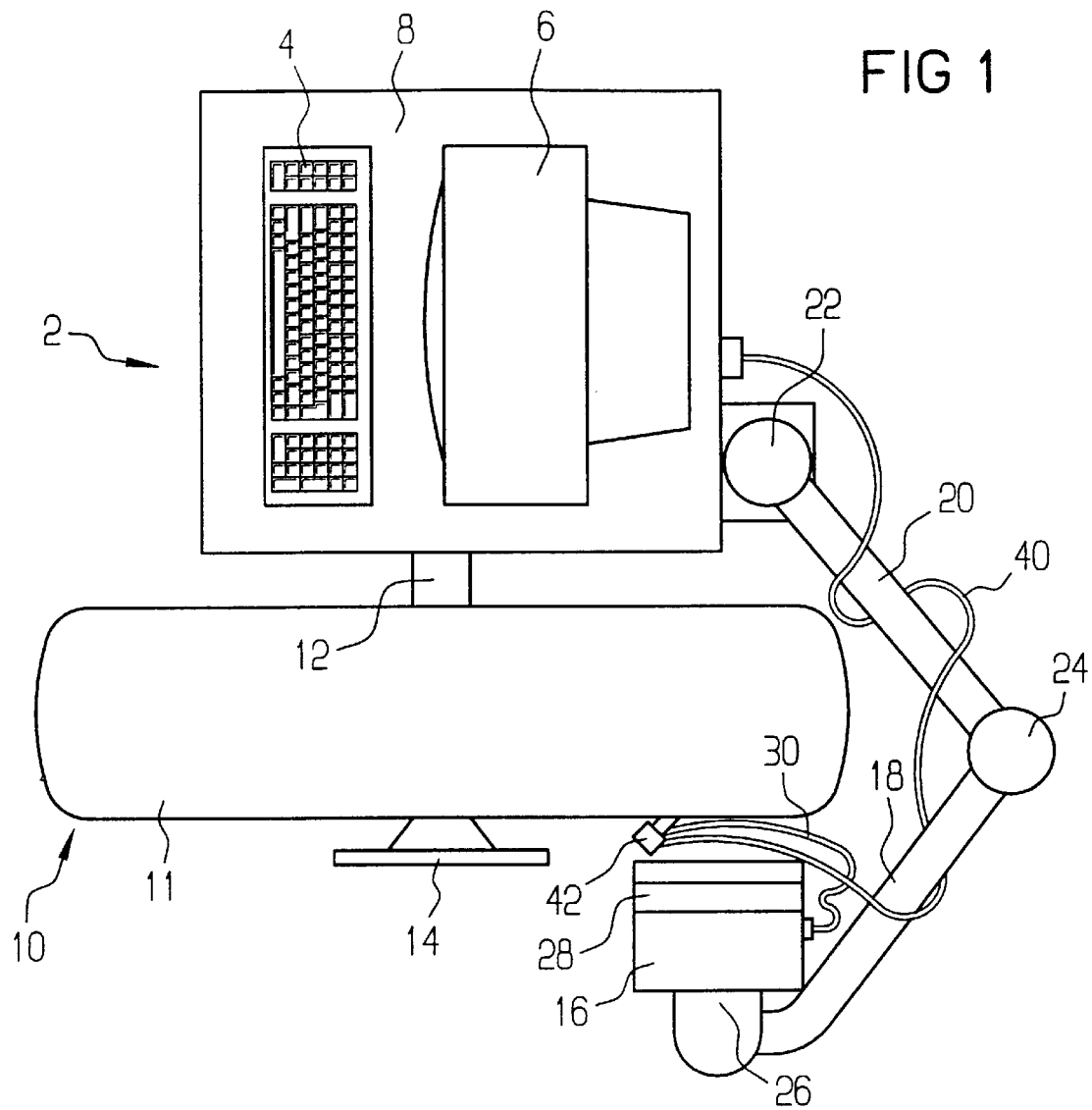
FIG. 1 is a diagrammatic plan view of a balancing machine as a first working embodiment of the tire checking apparatus of the invention.

FIG. 1 shows a balancing machine 2 with a keyboard 4 and a monitor 6, which are arranged on a housing 8. A wheel 10 with a tire 11 is mounted on a shaft 12 of the balancing machine 2 by means of a quick release clamping means 14, which engages a hub of the wheel 10.

On the housing 8 of the balancing machine 2 a test head 16 is attached by means of two parallel links or arms 18 and 20. The arm 20 has its one end pivotally mounted on a bracket 22 on the housing 8. A joint 24 connects the arm 20 with the arm 18 and the arm 18 is attached via a joint 26 with the test head 16. Accordingly the test head 16 may be pivoted from a position (not illustrated) wherein it is tucked away on the housing 8, into a checking position (FIG. 1), wherein it is opposite to the side wall of the tire 11 in the checking position. A handle 28 is provided on the test head 16 and possesses a push button switch (not illustrated), by means of which the positioning means (parallel links or arms 18 and 20) may be arrested, when the test head 16 has reached the check or test position.

The air pressure means comprises a pressure hose 40 and a valve 42 with an air pressure sensor, the valve 42 being adapted to be mounted on the valve of the tire. In the test head 16 a control means is provided for the air pressure means. The control means in the test head 16 is connected via a cable 30 with the valve, which is designed in the form of a solenoid valve, and with the air pressure sensor, which is integrated in the valve. The valve 42 is able to be set both as regards its aperture (setting the delivery rate per unit time) and also to open and close it so that the change in pressure in the tire may be set both by the degree of valve opening and also the time of valve opening.

Figure 2:
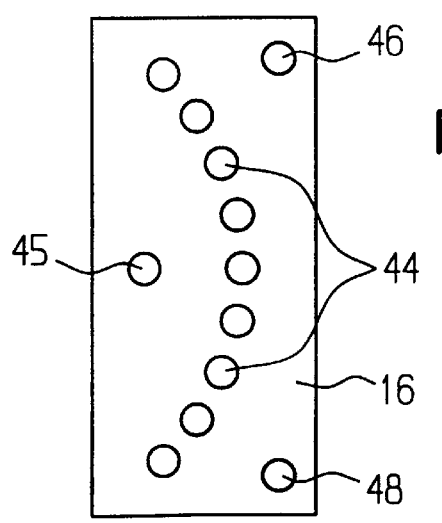
FIG. 2 is a front end-on view of the test head of the tire checking apparatus as in FIG. 1.

The test head 16 will be seen in FIG. 2 in a front end-on view and laser diodes 44 will be seen, which serve to produce interferograms. Furthermore two diodes 46 and 48 are provided, which serve to set the distance between the test head 16 and the side wall of the tire 11 during testing. For this purpose the two laser diodes 46 and 48 are so set obliquely in the visible range that the laser beams thereof are at an angle to each other and intersect at that point, which corresponds to the test distance between the test head and the tire's side surface. When the test head 16 is moved toward the tire 11, the checking distance will be reached, when the two laser beams coalesce to one point on the side wall of the tire 11. Lastly an objective 45 of a camera is diagrammatically represented, which takes pictures of the tire to be checked.

The speed of rotation of the motor of the balancing machine is so controlled by a variable frequency converter that the motor runs at a relatively low, constant speed of rotation. A synchro on the shaft 12 senses the shaft's speed and produces an output signal, which corresponds to the amount, by which the tire has been turned. The output signal of the synchro is employed in the computer to turn off the drive motor, when the tire has been incrementally turned through one check segment. In the case of the working embodiment illustrated in FIG. 2 a check segment is equal to ⅛ of the overall periphery of the tire so that the tire must be turned seven more times in order to fully check the tire.

The test head 16 is connected with a lead for the power supply to the test head and a data line leading to the computing unit. The motor for driving the shaft of the balancing machine and the synchro on the shaft of the balancing machine are also connected with the computing unit, such connecting leads and the computing unit being omitted in order to make the drawing more straightforward.

A central computing unit is provided for controlling the functions of the tire checking apparatus, such computing unit being integrated with the computer of the balancing machine so that here as well hardware complexity is not increased. Furthermore the monitor for display of the results of measurement is also employed for balancing and for the checking of the tire, information on both checking operations being displayed on the same monitor.

Figure 3:
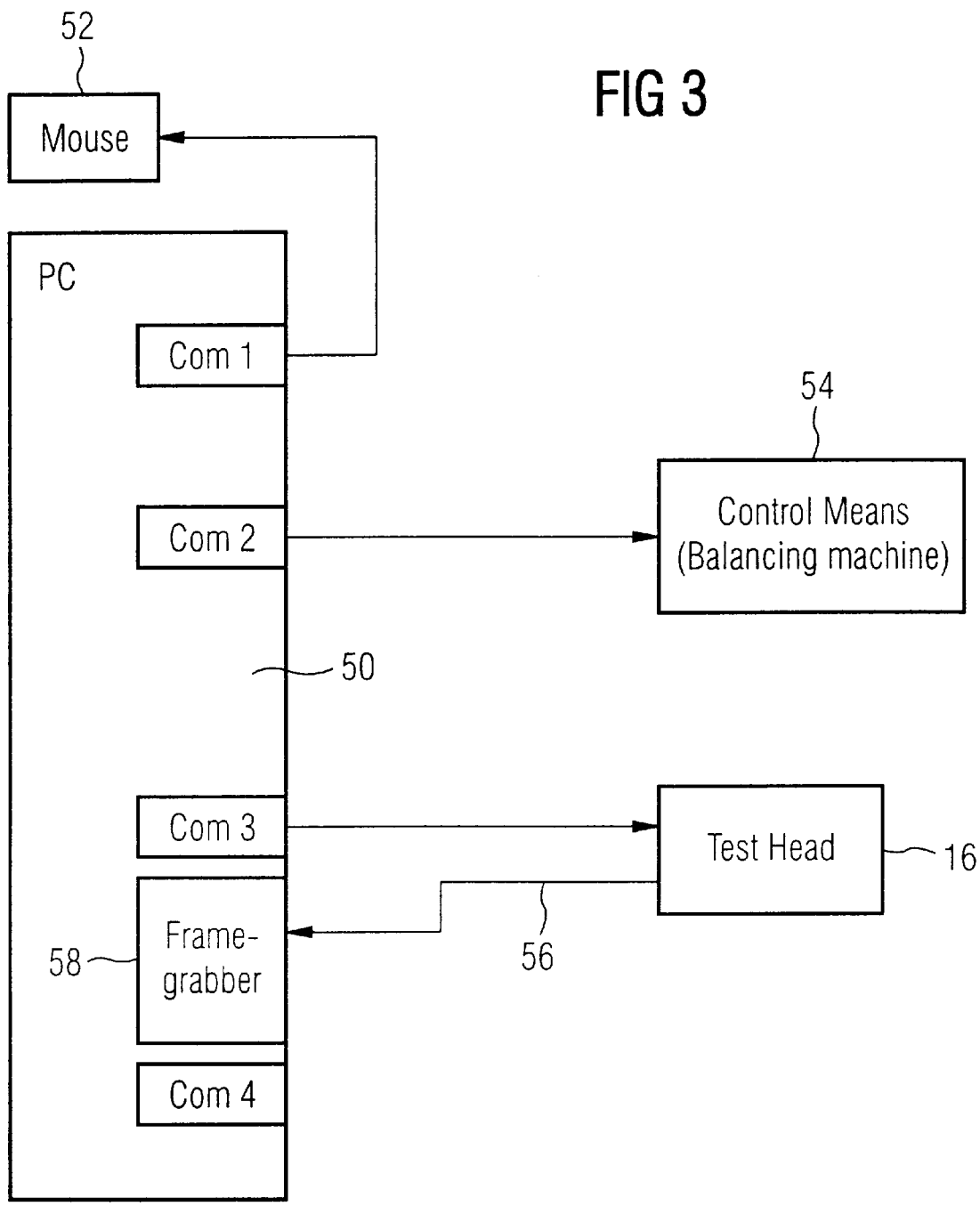
FIG. 3 shows a block diagram of the tire checking apparatus in accordance with the first embodiment.

FIG. 3 shows a block diagram of the first working embodiment of the tire checking apparatus. The central computing unit 50, which is illustrated in the form of a PC, conventionally possesses several "com" ports. A mouse 52 is connected with the com 1 port. The com 2 port is employed for a balancing machine control means 54, which essentially comprises the control for the drive motor of the balancing machine and is also responsible for incremental rotation segment by segment of the wheel during the checking thereof. The test head 16 is connected with the com port 3, while the video camera present in the test head is connected via a lead 56 with the frame grabber 58 in the computing unit 50. The design of the test head 16 will be described in more detail infra, while the connections for the keyboard and the monitor of the computing unit 50 are omitted in order to make the drawing more straightforward.

The manner of functioning of the tire checking apparatus is as follows. Firstly the wheel bearing the tire to be checked is mounted on a balancing machine, the shaft of the balancing machine being able to be rotated under the control of a computer both for wheel balancing and also for performing tire checking at different speeds of rotation.

The next step is for a test head to be moved toward the tire as far as a predetermined check distance for producing interferograms and it is arrested in this position. After mounting the tire on the balancing machine the air pressure valve is connected with the tire.

Prior to performing the first check sequence the wheel-specific data and, respectively, the data for incremental rotation of the shaft of the balancing machine, as for example the duration of drive at constant speed of rotation, which depend on the wheel dimensions are supplied to the computer or gotten from a look-up table.

Then tire checking is performed on a first check segment of the tire in accordance with the method as initially mentioned. After the first check segment has been examined, the wheel is incrementally turned on further by the size of a check segment using the shaft of the balancing machine, the shaft of the balancing machine being controlled via a computer and in a manner dependent on output signals of a synchro on the shaft of the balancing machine. When the next segment of the wheel has been brought into position, the test head is activated in order to check the next segment.

Thereafter as many check sequences and as many incremental rotational movements are performed as are necessary for checking the entire tire. At each check sequence there is, as already indicated, a reduction in pressure between a first series of interferograms and a second series, such reduction in pressure also being controlled by the computing unit. The reduction in pressure is accordingly performed in steps, the pressure starting at the rated pressure being reduced by one step in each check sequence. After conclusion of checking the air pressure the tire is then returned to the rated pressure, the valve and the control means connected with same also being employed.

Figure 4:
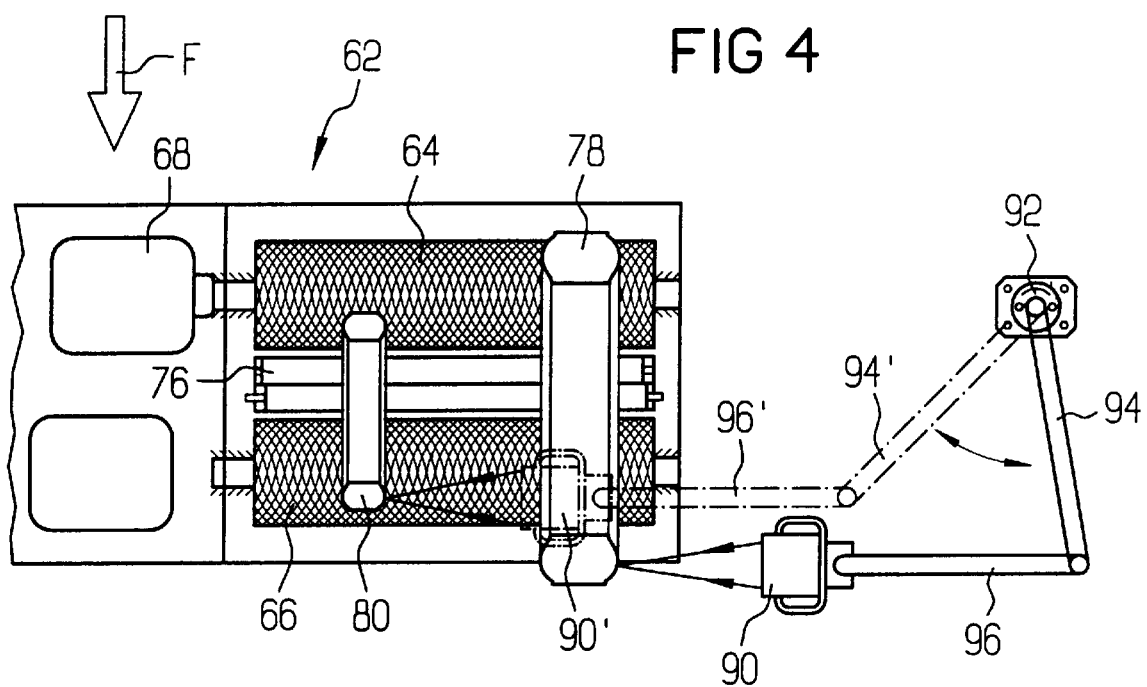
FIG. 4 is a diagrammatic plan view of one roller set of a brake test dynamometer as a second embodiment of the tire checking apparatus of the invention.
Figure 5:
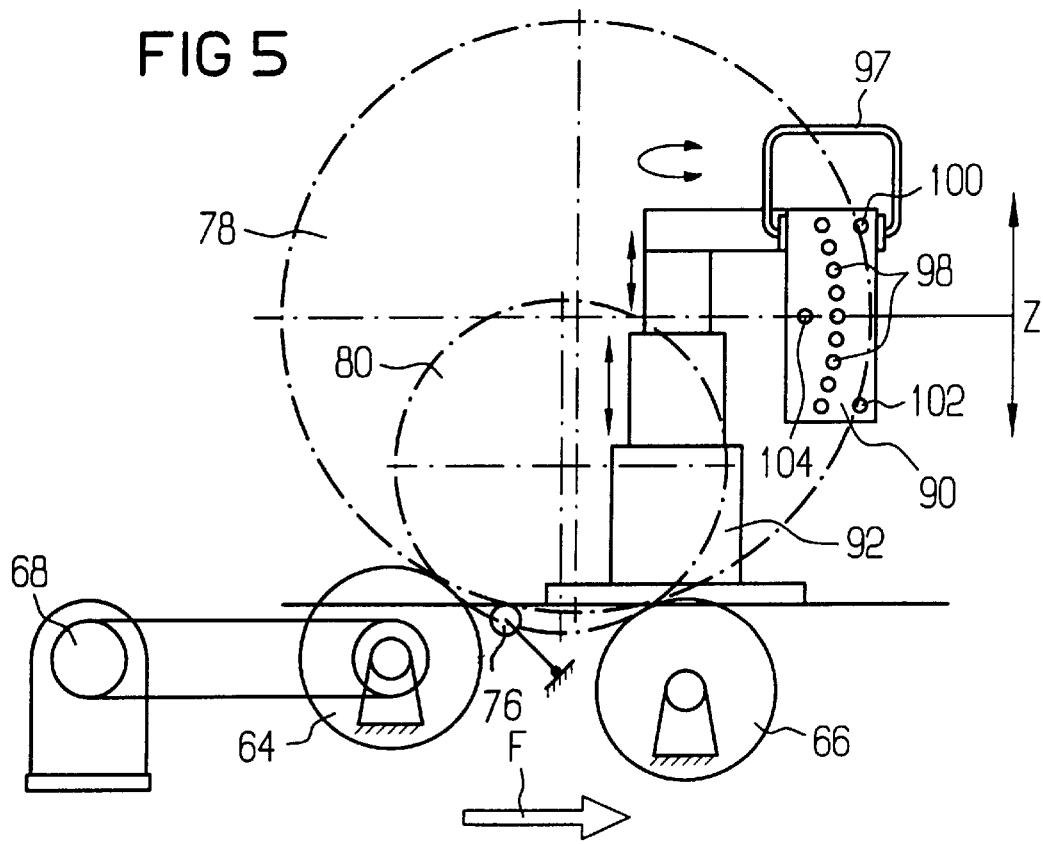
FIG. 5 is a diagrammatic front end-on view of the apparatus in accordance with FIG. 4.
Figure 6:
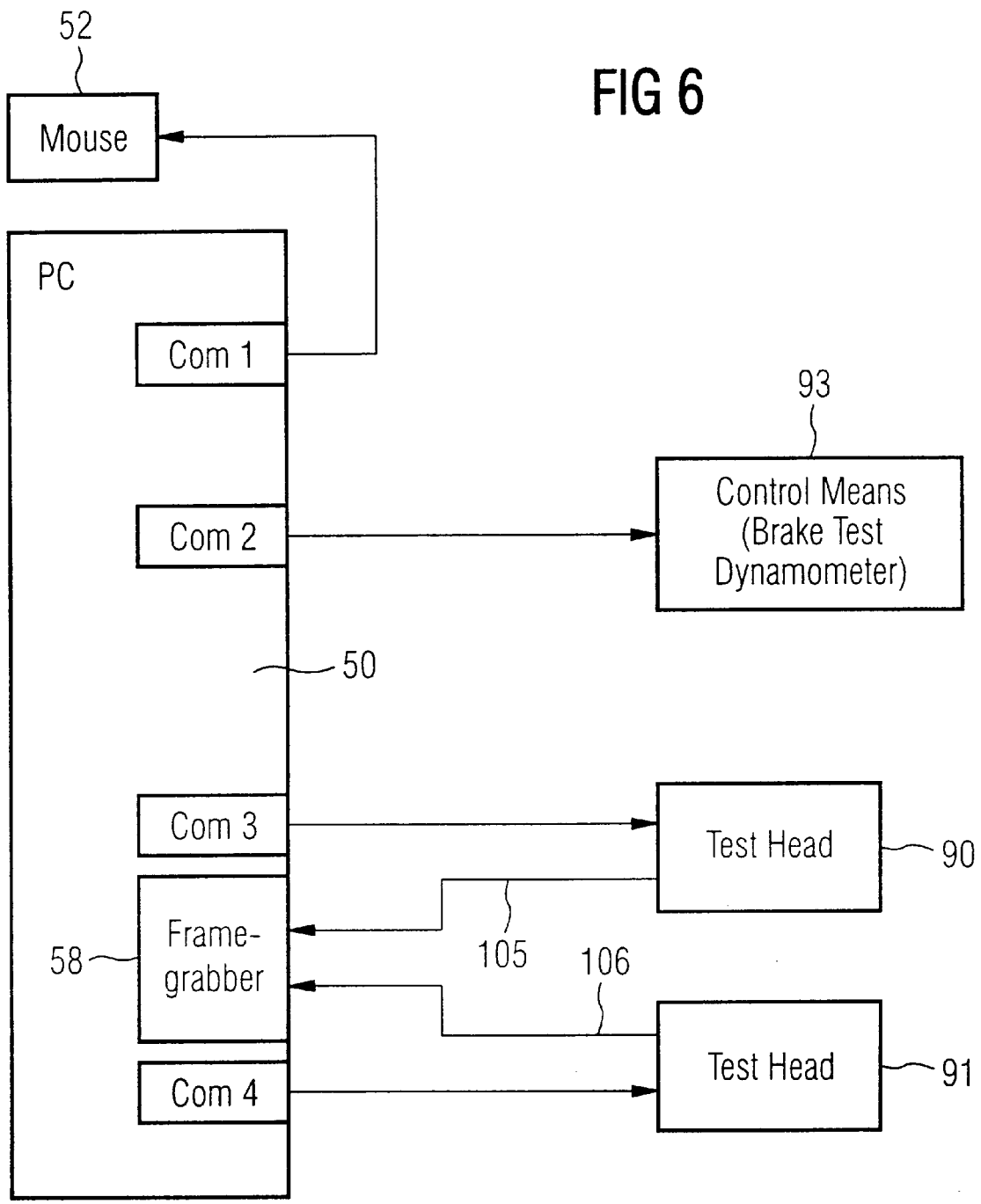
FIG. 6 is a block diagram of the tire checking apparatus according to the second working embodiment.

With reference to FIGS. 4 through 6 a second working embodiment of the tire checking apparatus of the invention will now be described. A roller set with two rollers 64 and 66 of a brake test dynamometer 62 are illustrated of which the roller 64 is driven by a motor 68. The other roller 66 free wheels. Between the rollers of the roller set a respective sensor roller 76 is arranged. The roller sets and the drive motors of the brake test dynamometer are arranged in a recess in the floor.

A vehicle is driven in the direction of the arrow F onto the roller sets so that for instance its front wheels are arranged in the two roller sets. In FIG. 4 a front wheel 78 of a motor vehicle is indicated, whose tires are to be checked. FIG. 4 furthermore shows a front wheel 80, which has a smaller diameter than the wheel 78 and belongs to another motor vehicle. The different sizes of the wheels 78 and 80 only serve to explain the manner of functioning of this embodiment of the invention.

A test head 90 is mounted by means of two pivot arms 94 and 96 on a Z column 92 able to be moved in the direction of the arrow Z in FIG. 5 vertically. Accordingly the test head 90 may be readily moved into the position with the correct check distance from the side surfaces of the tire 78. Then the pivot arms 94 and 96 and also the Z column 92 are arrested.

The air pressure means comprises, as in the first embodiment, a pressure hose and a solenoid valve, which may be mounted on the tire valve. The valve is able to be set both as regards its aperture (setting the delivery amount per unit time) and also to open and close it so that the change in pressure in the tire may be set both by the degree of valve opening and also the time in which the valve is open. The air pressure control means in the test head 90 is connected via a cable (not illustrated) with the air pressure sensor and the solenoid valve.

A handle 97 is provided on the test head 90 and with it the test head may be moved manually along the three axes until the check position has been reached. When the check position is reached, the arresting means of the three slides are activated using a push button switch, which is provided on the handle 97.

The test head 90 arranged on the column 92 is represented in FIG. 5 in a front end-on view and laser diodes 98 will be seen, which are employed for producing the interferograms. Furthermore two diodes 100 and 102 are provided, which serve to set the correct distance between the test head 90 and the side wall of the tire 78. For this purpose the two laser diodes 100 and 102 are so set obliquely in the visible range that the beams thereof are at an angle to each other and intersect at that point, which corresponds to the test distance between the test head and the tire's side wall. When the test head 90 is moved toward the tire 78, the check distance will be reached, when the two laser beams form one point on the side wall of the tire 78. Lastly an objective 104 of a camera is diagrammatically represented, which takes pictures of the tire to be checked.

The speed of rotation of the motor 68 is so controlled by a variable frequency converter (not illustrated) from the central computing unit of the tire checking apparatus that the motor runs at a relatively low, constant speed of rotation. The sensor roller 76 engages the tire in order, via the synchros to produce an output signal, which is equal to the amount by which the tire has been turned. The output signal of the synchros of the sensor roller 76 is employed in the computer to turn off the drive motor when the tire has been incrementally rotated through one check segment. In the case of the working embodiment illustrated in FIG. 5 a check segment is equal to ⅛ of the overall periphery of the tire so that the tire must be turned seven more times in order to fully check the tire.

The position of the test head 90' is indicated in phantom lines and provided with the reference numerals 90', 94' and 96'.

As shown in FIG. 4 it is possible to move the test head 90 into position at the correct distance both in the case of large wheels such as the wheel 78 and also in the case of small wheels such as the wheel 80.

A central computing unit is provided for controlling the functions of the tire checking apparatus, such computing unit being integrated with the computer of the balancing machine so that here as well hardware complexity is kept low. Furthermore the monitor for display of the results of measurement is also employed for the brake test and for the checking of the tire, information on both checking operations being displayed on the same monitor.

The manner of operation of the above described working embodiment of the tire checking apparatus of the invention on a brake test dynamometer is analogous to the manner of operation of the tire checking apparatus of the invention on a balancing machine as was described supra. The difference resides in that the two roller sets of a brake test dynamometer may be run under the control of the computer both for performing brake testing and also for performing tire testing with different speeds of rotation.

FIG. 6 shows a block diagram of the second working embodiment of the tire checking apparatus. The central computing unit 50, which is represented as a PC, conventionally possesses a plurality of "com" ports. A mouse 52 is connected with the com 1 port. The com 2 port is connected with a brake test dynamometer control means 93, which essentially comprises the control for the drive motor of the brake test dynamometer and is also responsible for incremental rotation of the wheel during tire checking. The test head 90 is connected with the com port 3, while the video camera present in the test head is connected via a lead 105 with the frame grabber 58 in the computing unit 50. The design of the test head 90 will be described in more detail infra, while the connections for the keyboard and the monitor of the computing unit 50 are omitted in order to make the drawing more straightforward. A second test head 91 is connected by means of a lead 106 with the frame grabber 58. In this working embodiment the frame grabber 58 is employed for processing the output signals of both test heads 90 and 91.

Figure 7:
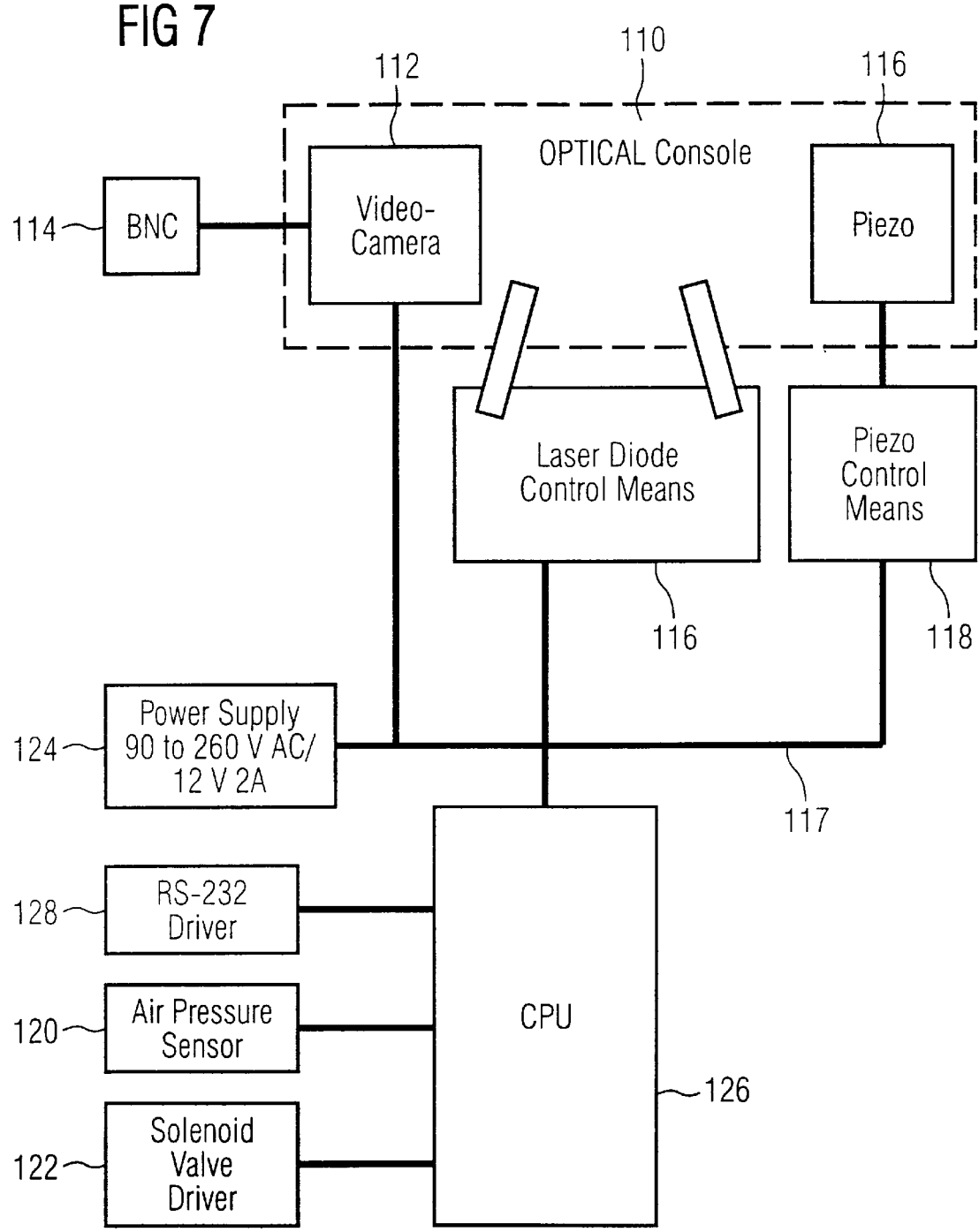
FIG. 7 is a block diagram of the optical and electronic units of a test head.

FIG. 7 shows a block diagram of the optical and electronic units of the test head, as for example the test head 16 or the test head 90 and 91. In the test head 16 an optical means 110 is provided for producing the interferograms, which comprises a video camera 112, the laser diodes and as piezo means 116.

In the optical means the light diffusely reflected back from the tire goes to the objective of a video camera, the light passing through a Michelson interferometer, in which the light beam is firstly split up at a ray splitter into two beam parts. After reflection at the mirrors the beam parts are recombined prior to passing to the objective of the video camera 112. In the Michelson interferometer, using a setting element it is possible for one image part to be tilted in relation to the other image part. This leads to two mutually shifted images of the tire side wall. With the aid of a piezo element it is possible for the second beam part to be shifted in minimum steps. This function serves for determining the phase relationship of the diffusely reflected light and accordingly for determination of deformation. The signal of the video camera 112 (CCD camera) is supplied via the BNC connection 114 (FIG. 7) to the PCI frame grabber 58, which is provided in the computing unit 50.

An electronic control means for the optical means 110 comprises a laser diode control means 116 and a piezo control means 118. The air pressure control means includes an air pressure sensor 120 and a solenoid valve drive 122. Lastly FIG. 7 shows a power supply 124 for the electronic units in the test head. The electrical units are controlled by a computer CPU 126, which is connected by means of an RS-232 driver 128 with the computing unit (PC) 50, in which a sequence control means of the tire checking apparatus is provided together with means to evaluate the interferograms.

Each of the test heads 16, 90 and 91 operates as an autonomic system. Control is taken over from the computing unit 50 through a serial interface and the RS-232 driver 128. Accordingly the piezo means 116 for producing special images (wavelength shift), the laser diodes 44 and 98 for illuminating the tire side walls, the laser diodes 46, 48, 100 and 102 for setting the distance of the test heads from the tires, the video camera 112 for producing an image, the air pressure sensor 120 for checking the tire pressure, the solenoid valve driver 122 for the control of the solenoid valve 42 and a serial interface are to be operated via the driver 128. The system is so designed that via one serial system bus 117, preferably an I²C bus, the individual component groups may be controlled via the CPU 126. Safety-related elements of the tire checking apparatus, as for instance the condition that the illuminating laser diodes, for instance the diodes 44, may only be turned on when a tire is opposite to the test head, are consequently not under the control of the computing unit 50, since such computing unit elements are ensured by the software and hardware independently of the computing unit 50. Owing to the serial system architecture it is possible also for future options to be adopted without any problems. An expansion of up to a maximum of 128 component groups is possible. For example LCD displays, infrared remote control elements, LED display means, relay outputs, semiconductor outputs, additional analog and digital output and furthermore key areas are possible. Owing to the system architecture it is more especially possible to operate all component groups in the test head, including the air pressure control, using a single interface.

Each test head is connected by means of a commercially available equipment cable with the principal power supply. It can operate in a voltage range of 90 to 260 V and at a frequency of 40 to 400 Hz without changing means. Internally following the power supply 124 all component groups including the video camera 112 and the piezo means 116 are supplied with 12 V DC. The system is accordingly safe to touch. The high voltage for driving the piezo means 116 is locally produced in the piezo control means. The component groups of the individual system component are connected together by a flat cable in bus technology, that is to say via the system bus 117. Wiring is accordingly extremely simple.

A further advantageous feature is possible if the power supply 124 and the remaining component groups 116, 118, 120, 122, 126 and 128 are collected together on one board, a system bus, preferably a I²C bus only being provided for driving a piezo amplifier in the control means 188 for the piezo means. This means that there is a further simplification of the tire checking apparatus of the invention as regards structural and hardware complexity.

It is to be understood that the above description is intended to be illustrative and not restrictive. Many embodiments will be apparent to those skilled in the art upon reviewing the above description. Those skilled in the art will recognize as an equivalent or alternative method of tire testing and combining a tire testing machine with a wheel balancing machine. The scope of the invention should, therefore, be determined not as reference to the above description, but should instead be determined with reference to the apended claims along with the full scope of equivalence to which such claims are entitled.

What is claimed is:

1. A tire testing device comprising:

an air pressure means for changing the tire pressure of a wheel, a test head and a computer, which prior to and after a change in the air pressure respectively with coherent radiation produce an interferogram of the tire surface from which the information about defects present in the tire is obtained, a positioning means for the test head, with which the test head is to be positioned for producing interferograms at a predetermined distance from the tire, and a control means in order to incrementally rotate the wheel by an amount equal to a test segment, when the examination of the preceding test segment is completed, wherein (a) an optical means for producing the interferograms, an electronic control means for the optical means and the air pressure control means are collected together in the test head, wherein (b) the test head comprises a CPU which is provided for the electronic control of the optical means and the air pressure control means and is connected via an interface with the computer, wherein (c) a system bus is provided for connecting the electronic units of the test head, and wherein (d) a sequence control means for the tire testing device and means for evaluating the interferogram are provided in the computer.

2. The device as claimed in claim 1, wherein the optical means comprises a video camera, laser diodes and a piezo means, wherein the electronic control means controlled by the computer for the optical means comprises a laser diode control means and an piezo means control means.

3. The device as claimed in claim 2, wherein a system bus is provided for connecting the CPU with the piezo means control means of the test head.

4. The device as claimed in claim 3, wherein the system bus is an $1^2C$ bus.

5. The device as claimed in claim 1, wherein the wheel drive control means of a balancing machine serves for segment-wise incremental rotation of the wheel, wherein the computer of the tire testing device is integrated in the computer of the balancing machine.

6. The device as claimed in claim 5, wherein a synchro is connected with the shaft of the balancing machine, which senses incremental rotation of the balancing machine and feeds rotation information to the computer, which halts further rotation of the motor drive when the wheel has turned by one test segment.

7. The device as claimed in claim 5, wherein a motor for segment-wise rotation of the wheel is provided and operated using a frequency converter which may be controlled by the computer.

8. The device as claimed in claim 1, wherein the air pressure control means includes a pressure sensor and a solenoid valve driver.

9. The apparatus as claimed in claim 1, comprising a valve which is controllable both as regards the size of its aperture and as regards the time of opening.

10. The device as claimed in claim 9, comprising air pressure control means to control the pressure in the tire, the tire pressure being reduced for each checking step by one step and after the conclusion of checking being returned to the rated pressure.

11. The device as claimed in claim 1, wherein a power supply is integrated in the test head for supplying power to electronic units of the test head.

12. The device as claimed in claim 1, wherein the system bus is an 12C bus.

13. The device as claimed in claim 1, wherein any electronic units of the test head are mounted together on one board.

14. The device as claimed in claim 1, wherein any electronic units of the test head as well as a power supply integrated in the test head for supplying power to the electronic units of the test head are mounted together on one board.

15. The device as claimed in claim 1, wherein at least one driven roller set of a brake test dynamometer, on which a motor vehicle is to be driven having the wheel, which bears the tire to be checked, serves for segment-wise incremental rotation of the wheel, wherein the computer of the tire testing device is integrated in the computer of the brake test dynamometer.

16. The device as claimed in claim 15, comprising a sensor roller which senses the incremental rotation of the tire and via a synchro causes the computer to respond to such rotation, said computer then turning off the motor drive when the tire has been further through one test segment.

17. The device as claimed in claim 15, wherein a motor for segment-wise rotation of the wheel is operated using a frequency converter, which may be controlled by the computer.

* * * * *